3,384,498
PLASTIC MODELING COMPOSITION
Robert B. Ahrabi, Lafayette, La., assignor to Oil Center Research, Inc., a corporation of Louisiana
No Drawing. Filed Jan. 4, 1967, Ser. No. 607,160
10 Claims. (Cl. 106—38.5)

ABSTRACT OF THE DISCLOSURE

A plastic composition comprising manogalactan gum, alkali metal borate, boric acid, high molecular weight polysaccharide, bacteriostat, fungistat, filler, colorant and perfume.

---

This invention relates to a plastic modeling composition which may be formulated in varying degrees of pliability. More particularly, the present invention relates to a plastic modeling composition such as may be utilized by children as a novelty item, which composition is characterized by a thixotropic nature which greatly enhances its utility for the aforementioned purpose. More specifically, the present invention relates to a dry pulverulent precursor of a thixotropic plastic modeling composition, which pulverulent composition may be hydrated in selectively variable degrees of pliability.

Plastic modeling compositions of a soft, pliable consistency somewhat suitable as use for novelty purposes have been proposed heretofore and generally comprise a vegetable flour together with a soluble saline extender and hydrocarbon distillate to soften the composition and control the stickiness of the saline extended flour which is normally gelatinized with water prior to packaging for distribution. From the foregoing, it will be apparent that such prior art compositions must for all practical purposes be furnished pre-mixed, i.e. in the hydrated form, inasmuch as the plasticizing of the components of the composition must be carried forth under reasonably specific conditions in order to render the finished product suitable for use. Thus, it will also be appreciated that it is difficult if not impossible, as a practical matter, to supply such prior art compositions in more than one degree of pliability. The prior art compositions have also been found to be somewhat less than satisfactory by virtue of the fact that their cohesiveness is of such a relatively low magnitude that they tend to crumble into numerous fragments which under normal circumstances become embedded in carpeting, upholstered furniture and the like. Thus they present a definite problem when attempting to clean such articles of the embedded composition. Still another distinct disadvantage of many plastic modeling compositions proposed heretofore is the fact that they generally cannot be reclaimed, i.e. rehydrated, once they have lost their loosely bound water of hydration.

Manogalactan containing compositions have been proposed heretofore such as for the coating and sizing of paper for example. However, the prior art manogalactan compositions failed to suggest the proper combination of co-active components or proportions thereof necessary to permit utilization of a manogalactan gum, such as guar gum for example to produce a plastic composition characterized by the solid physical properties such as would render the composition suitable for use as a novelty item wherein the composition could be molded, stretched, reworked and the like without crumbling apart, sticking to the hands of the user, or soiling clothing, furniture and the like.

Furthermore, while it has long been appreciated that guar gum should preferably be rendered somewhat hydrophobic until such time as it is relatively uniformly dispersed in the water being utilized to hydrate the gum it has not been fully appreciated heretofore that certain relatively critical parameters must be established for the hydration of guar gum so as to form a plastic modeling composition characterized by the necessary properties, i.e. pliability, cohesiveness, ability to be reclaimed, i.e., rehydrated and the like.

It is therefore a primary object of the present invention to provide a plastic modeling composition of selectively variable pliability which comprises a significant proportion of guar gum rendered temporarily hydrophobic by a suitable amount of an alkali metal borate so as to facilitate the dispersion of the gum in the amount of water necessary to hydrate the gum to a degree of pliability desired which composition includes a specific agent capable of counteracting or neutralizing the hydrophobing agent in a controlled manner so as to form an elastic, plastic, moldable, quasi thixotropic modeling composition particularly well suited for utilization as a novelty item. It will become apparent as the description continues that the novel composition of the present invention may be advantageously utilized for a plurality of other utilities.

An aspect of the present invention is the inclusion with the aforementioned components of a coactive high molecular weight biologically synthesized polysaccharide such as produced by the organism *Xanthomonas campestris* marketed under the trademark Kelzan and described in Patent No. 3,000,790 and 3,054,689 wherein the polysaccharide is identified as B-1459 and comprises the acetyl-ester form of a polymer comprising mannose glucose and glucuronic acid (as the potassium salt) in the approximate ratio of 2:1:1. The B-1459 polysaccharide is utilized to immediately establish a gel system so as to maintain a reasonably homogeneous suspension of the gum-hydrophobing agent-neutralizing substance system so as to materially assist in dispersing the gum and maintaining such dispersion until such time as the gum becomes fully hydrated and polymerization of quasi-polymerization thereof continues to the degree desired. In this regard, it will be appreciated from the following discussion that when utilizing relatively small amounts of gum to relatively large amounts of hydrating water the action of the B-1459 greatly assists the coaction of the components of the composition to produce a pliable, moldable composition as anticipated by the present invention.

Compositions formulated in accordance with this invention also preferably include a plurality of optional components such as comprising fillers, extenders, softening agents, fungistats, bacteriostats, colorants, perfumes, etc., primarily intended to complement the properties of the basic gel system so as to enhance the utility of the composition for amusement purposes and the like.

Referring in further detail to the gel system comprising the salient feature of the present invention, it is appreciated that gels formed by the addition of alkali metal borates such as borax to guar gum sols are known in the art. These gels are thought to be formed through the mechanism of hydrogen bonding. It is further known that when these gels are separated into several portions and then mixed together, the collected portions will accumulate into a homogeneous mass. However, such guar gum-borax gels exhibit a great tendency towards cold flow and accordingly when placed on a flat surface, for example, they will tend to spread out over a large area. It will thus be appreciated that a guar gum-borax gel system, per se, would be somewhat unsuitable for utilization as an amusement item due to the attendant difficulties in handling such a relatively fluid, cold-flow gel.

Although the specific mechanism involved is not fully understood it has been discovered that a guar gum-alkali metal borate gel system, may be hydrated in the presence of a substance which coacts with the borax or other alkali metal borate to progressively counteract the hydrophobing action of the borax or other alkali metal borate so as to produce a guar gum-alkali metal borate-boric acid gel system varying in physical nature from a relatively fluid to a relatively solid gel system which in addition to possessing the desirable coalescing properties indicated heretofore, not generally possible with systems excluding boric acid, also possesses a reasonably significant resistance to cold flow, or creep. Furthermore the composition is characterized by quasi-thixotropic properties thus rendering it highly suitable to be utilized for amusement purposes such as by children.

It has been found that prior to hydration the dry pulverant gel system precursor may contain from approximately 1% to approximately 98.9% guar gum and preferably about 65%. The minimum allowable operable proportion of alkali metal borate to the total weight of the dry pulverulent composition is approximately 0.1% and the maximum approximately 20%, except as will be noted hereinafter when using a borate neutralizing agent comprising boric acid and another substance the maximum percentage will be higher. The proportion of alkali metal borate, i.e. borax (sodium tetraborate), which is most complementary to the final hydrated composition comprises approximately 0.1% to 9.0% and preferably 2% by weight of the dry pulverulent gel precursor. While particular emphasis has been placed on the utilization of sodium tetra-borate (borax) as the hydrophobing or gum-dispersing assistant, it will be appreciated that other alkali metal borates, such as for example, sodium perborate, potassium metaborate, potassium tetraborate, and sodium metaborate and the like may also be utilized in the practice of the present invention.

With regard to the neutralizing agent utilized to alter the pH of the initial guar gum-alkali metal borate sol, so as to counteract the hydrophobing action of the alkali metal borate in order to permit hydration of the normally hydrophilic gum, it has been found to be critical to utilize an acidic substance including at least a minor proportion of boric acid. More specifically the criticality of the incorporation of at least a minor proportion of boric acid is dramatically pointed up by the fact that many other water-soluble acid salts, such as monosodium phosphate, aluminum sulfate and ammonium chloride as well as organic and inorganic acids such as acetic, nitric, citric, hydrochloric, sulphuric and other acidic compounds per se are inoperative for the purposes of the present invention without the addition of some boric acid inasmuch as the gum-alkali metal borate-acid gel system formed would be totally unsuitable for the purpose intended in this instance due to the fact that such acids other than boric acid do not promote the formation of a pliable, moldable, quasi-thixotropic composition. In general the proportion of boric acid required comprises approximately 5% to 98% and preferably about 33%, by weight, of the dry pulverulent gel precursor.

More particularly, the proportion of boric acid per se required is directly proportional to the percentage of alkali metal borate utilized inasmuch as the boric acid must be present in sufficient concentration during dispersion of the gum-alkali metal borate so as to progressively, since it dissolves more slowly than the alkali metal borate, neutralize the highly alkaline guar gum-alkali metal borate sol so that the pH thereof is reduced below pH 7 after which approximate pH the alkali metal borate no longer exhibits a hydrophobing effect on the guar gum thus permitting hydration of the gum to be carried to completion whereby polymerization occurs to a degree consistent with the relative proportion of guar gum to hydrating water. It will thus be understood that it is possible to bring the pH of the guar gum-alkali metal borate solution to a range most favorable to the final hydrated composition; however, the composition will not be characterized by the desired properties until a minor proportion of boric acid is added at which time the composition will assume the desired properties. As previously indicated the inclusion of approximately .5% of high M.W. polysaccharide in the dry pulverulent precursor assists in maintaining the desired dispersion of the particles comprising the sol until such time as gellation occurs, which may upwardly of 20 minutes in the case of relatively high proportions of water to guar gum. The dry pulverulent gel precursor may be hydrated with as much as 200 parts of water per part of dry composition and as little as one part of water per one part of dry composition.

Although as indicated heretofore the boric acid utilized must be sufficient to counteract the alkali metal borate the setting time of the hydrated pulverant composition may be controlled by adjusting the relative amount of alkali metal borate and boric acid utilized keeping in mind, of course, that sufficient alkali metal borate to render the gum hydrophobic must be utilized and sufficient boric acid or other acidic substance and boric acid to counteract the alkali metal borate must likewise be utilized. In this regard, an increase in the proportion of the alkali metal borate used will cause an increase in the setting time whereas an increase in the proportion of boric acid used will decrease the setting time, i.e. the time required for the sol to form a gel characterized by the complete degree of polymerization normally possible for the respective proportions of gum and water.

Referring once again to the optional components of the plastic modeling composition of the present invention they may comprise, for example: fillers and extenders such as titanium dioxide, particulate Teflon, etc.; a softener such as glycerine; a colorant, such as a suitable F.D.A. approved non-toxic colorant; a perfume, preferably absorbed on a dry carrier; together with a suitable bacteriostat, such as sodium benzoate; a fungistat such as potassium sorbate; and the like.

Specific examples of the relative proportion of the components in both the dry pulverulent gel precursor and the hydrated form thereof set forth hereinafter result in the production of a gel system varying from a fast set, rubbery consistency to a delayed set, malleable and stretchable consistency and as a further example of the physical properties of the hydrated dry composition, depending upon the proportion of the water utilized, it will vary from a very dense, rubber-like material and when a relatively high proportion of water to gum is utilized an almost free-flowing, although not cold flowing, stretchable composition is produced.

The following examples are set forth to more specifically characterize exemplary compositions, both dry and hydrated, produced in accordance with the principles of the present invention. It will be understood that the preferred dry pulverulent comprises that of Example II and the preferred hydrated composition that of Example VIII.

Example I

| | Approximate percent by weight |
|---|---|
| Guar gum | 90 |
| Boric acid | 5 |
| Borax | 1 |
| Filler or extender (particulate Teflon) | 4 |

Example II

| | |
|---|---|
| Guar gum | 65 |
| Boric acid | 33 |
| Borax | 2 |

Example III

| | |
|---|---|
| Guar gum | 10 |
| Boric acid | 80 |
| Borax | 9 |
| Filler or extender (particulate Teflon) | 1 |

Example IV

| | |
|---|---|
| Guar gum | 64.4 |
| Boric acid | 33.8 |
| Borax | 1.8 |

Example V

| | Approximate percent by weight |
|---|---|
| Guar gum | 64.04 |
| Boric acid | 33.71 |
| Borax | 1.70 |
| B-1459 polysaccharide | .55 |

Example VI

| | |
|---|---|
| Guar gum | 60.41 |
| Boric acid | 31.70 |
| Borax | 1.69 |
| B-1459 polysaccharide | .53 |
| Sodium benzoate | 1.06 |
| Potassium sorbate | .53 |
| Colorant | 3.00 |
| Perfume (absorbed on a minute amount of a carrier) | .02 |
| Particulate Teflon | 1.06 |

The dry pulverulent compositions of Examples I to VI may be hydrated, and thus polymerized, with one part of the powder to approximately 1 to 200 parts of water, on the basis of weight, to form non-toxic plastic modeling compositions varying in pliability from a relatively hard rubbery consistency, when using a low water to powder ratio, to a highly pliable elastic consistency when using a high water to powder ratio.

Example VII

Dense rubbery material

| | Approximate percent by weight |
|---|---|
| Guar gum | 12.00 |
| Boric acid | 6.43 |
| Borax | .34 |
| High M.W. polysaccharide (B-1459) | .10 |
| Sodium benzoate | .21 |
| Potassium sorbate | .10 |
| Colorant | .60 |
| Perfume | .01 |
| Particulate Teflon | .21 |
| Water | 80.00 |

Example VIII

Free-flowing, stretchable material

| | Approximate percent by weight |
|---|---|
| Guar gum | 3.77 |
| Boric acid | 1.98 |
| Borax | .10 |
| High M.W. polysaccharide (B-1459) | .03 |
| Sodium benzoate | .06 |
| Potassium sorbate | .03 |
| Colorant | .12 |
| Perfume | .01 |
| Particulate Teflon | .06 |
| Water | 93.84 |

The composition and the ingredients previously described are preferably distributed pre-mixed in powdered form. The final composition in powdered form may then be rendered plastic by the addition of water by the ultimate user. Various alterations or additions can then be made to the plastic form of the composition. An example of the alteration possibilities includes the addition of foaming agents which will permit a lighter weight material or produce a material that will fill larger areas. Additives or solids may also be introduced to effect a density change or to provide a more solid material. Through the additions of solids, the composition may be likened to a cement or a bonding composition. The additives, in this sense, are used to provide added strength to the material.

The final composition in pliable form, can be molded and left to dry in this molded form. Upon drying the material has a tendency to shrink to form a very dense hard mass of the same general configuration as the moist article. The percentage of shrinkage corresponds to the percentage of water in the moist pliable composition used to mold the shrunken article. When the dried form is reintroduced into water, it has a tendency to reassume its original pliable molded configuration.

There are an almost unlimited number of possibilities of making use of the final composition. Insulation material can be produced by filling the elastic material with such ingredients as rice hulls, etc. When these additional ingredients are added and the material is allowed to dry, the composition acts as a bonding agent and forms a solid. As an amusement item, the composition with a high liquid concentration may be used in conjunction with toys and toy supplies presently marketed for the molding of insects, etc. Coloring books printed with hidden color water active inks are available, whereby the composition may be applied to the pages of the books to transfer the printed matter from the book to the composition to produce a colored picture thereon.

Thus it will be appreciated that the present invention provides a non-toxic, amusement item to be used by children and adults alike. The classification of the composition should not be construed in the narrow sense as merely an amusement item, however, because the possibilities of use are limited only by the individual's imagination. The composition provides each person with the feeling that they were instrumental in producing the final result, since they are able to make the water/powder combination to produce the moldable, stretchable end product. The possibility remains, however, that the material can be made available commercially in a pre-mixed form whereby it is distributed in a plurality of degrees of pliability. As can be seen, subsequent use is limitless. Several examples include blowing bubbles, making balls, necklaces and rings, building blocks for toy houses, as well as molding animals and other characters, etc.

In addition to the top concept, this invention provides composition suitable for uses other than as an amusement item. This composition exhibits potential as an exercising instrument in the medical field such as for persons having to exercise the hands by manipulating an object. The invention provides an enjoyable and captivating pastime to children and adults that may be confined or bedridden. Thus each individual's imagination is the only limiting factor. The composition has also been utilized to provide a cushion that conforms to the configuration of one's body.

Although the present invention has been described with reference to specific examples, it will be apparent to those skilled in the art, that modifications of this invention can be made and that equivalents can be substituted without departing from the spirit of the invention.

What is claimed as new is as follows:

1. A dry pulverulent composition adapted to be hydrated with from 1 part to 200 parts, by weight, of water to form a pliable, cohesive, moldable, non-crumbly, non-toxic plastic composition which consists essentially of as active components, on the basis of weight about 3.5% to 90% guar gum, alkali metal borate, and at least 5% boric acid, said boric acid component being present in an excess to the alkali metal borate so as to lower the pH of a hydrated system produced therefrom to at least below 7.0.

2. The composition of claim 1 including a higher molecular weight polysaccharide comprising the alkali deacetylated derivative of the acetyl-ester form of a polymer comprising mannose, glucose and potassium glucuronate and said alkali metal borate is borax.

3. A dry pulverulent composition adapted to be hydrated with about 1 part to about 200 parts, by weight, of water to form a pliable, moldable, cohesive, non-crumbly, non-toxic plastic composition which consists essentially of as active components, on the basis of weight, about 3.5% to 90% guar gum, about 0.1% to 20% alkali metal borate and about 5% to 98% boric acid, said acid being present in an excess to the alkali metal borate so as to lower the pH of a hydrated system produced therefrom to at least below 7.0.

4. The composition of claim 3 including about 0.5% of a high molecular weight polysaccharide comprising the alkali deacetylated derivative of the acetyl-ester form of a polymer comprising mannose, glucose and potassium glucuronate.

5. The composition of claim 3 wherein said alkali metal borate is borax.

6. A dry pulverulent composition adapted to be hydrated with about 1 part to about 200 parts, by weight, of water to form a pliable, moldable, cohesive, non-crumbly, non-toxic plastic composition which consists essentially of as active components, on the basis of weight, about 65% guar gum, about 2% alkali metal borate and about 33% boric acid.

7. The composition of claim 6 including about 0.5% of a high molecular weight polysaccharide, comprising the akali deacetylated derivative of the acetyl-ester form of a polymer comprising mannose, glucose and potassium glucuronate.

8. The composition of claim 6 wherein said alkali metal borate is borax.

9. A pliable, cohesive, moldable, non-crumbly, non-toxic plastic composition which consists essentially of 1 part by weight of a dry pulverulent precursor consisting essentially of as active components about 3.5% to 90% guar gum, about 0.1% to 20% alkali metal borate, and about 5% to 98% boric acid, said acid being present in an excess to the alkali metal borate so as to lower the pH of the composition to at least below 7.0 hydrated with about 1 part to 200 parts of water.

10. The composition of claim 9 wherein the dry pulverulent precusor includes about 0.5% of a high molecular weight polysaccharide comprising the alkali deacetylated derivative of the acetyl-ester form of a polymer comprising mannose, glucose and potassium glucuronate and said alkali metal borate is borax.

References Cited

UNITED STATES PATENTS

| | | |
|---|---|---|
| 2,868,664 | 1/1959 | Golstein. |
| 3,000,790 | 9/1961 | Jeanes et al. |
| 3,054,689 | 9/1962 | Jeanes et al. |
| 3,167,440 | 1/1965 | McVicker et al. |
| 3,265,631 | 8/1966 | Jordan. |
| 2,644,763 | 7/1953 | Frisch et al. _____ 160—208 |
| 2,644,765 | 7/1953 | Frisch et al. _____ 106—208 |
| 3,163,219 | 12/1964 | Wyant et al. _____ 252—8.55 |
| 3,058,909 | 10/1962 | Kern _____ 252—8.55 |

ALEXANDER H. BRODMERKEL, *Primary Examiner.*

D. J. ARNOLD, *Assistant Examiner.*